(12) United States Patent
Tegethoff et al.

(10) Patent No.: US 10,095,194 B2
(45) Date of Patent: Oct. 9, 2018

(54) METHOD FOR CONFIGURING A TEST DEVICE SET UP FOR TESTING AN ELECTRONIC CONTROL UNIT

(71) Applicant: dSPACE digital signal processing and control engineering GmbH, Paderborn (DE)

(72) Inventors: Marc Tegethoff, Paderborn (DE); Martin Kronmueller, Salzkotten (DE); Sebastian Reuschel, Paderborn (DE); Achim Schumacher, Bad Lippspringe (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 241 days.

(21) Appl. No.: 15/133,502

(22) Filed: Apr. 20, 2016

(65) Prior Publication Data
US 2017/0242409 A1    Aug. 24, 2017

(30) Foreign Application Priority Data
Feb. 19, 2016 (DE) .................. 10 2016 102 920

(51) Int. Cl.
*G05B 9/02*   (2006.01)
*G06F 9/455*  (2018.01)

(52) U.S. Cl.
CPC .............. *G05B 9/02* (2013.01); *G06F 9/455* (2013.01)

(58) Field of Classification Search
CPC .................................. G05B 9/02; G06F 9/455
See application file for complete search history.

(56) References Cited

U.S. PATENT DOCUMENTS

| | | | | | |
|---|---|---|---|---|---|
| 5,198,758 | A | * | 3/1993 | Iknaian | G01R 31/3016 324/73.1 |
| 5,206,582 | A | * | 4/1993 | Ekstedt | G01R 31/316 324/73.1 |
| 5,260,946 | A | * | 11/1993 | Nunally | G11C 29/006 714/724 |

(Continued)

OTHER PUBLICATIONS

German Search Report for German Application No. 102016102920.3 dated Dec. 15, 2016 with English translation.

(Continued)

*Primary Examiner* — Ramesh Patel
(74) *Attorney, Agent, or Firm* — Muncy, Geissler, Olds & Lowe, P.C.

(57) ABSTRACT

A method for configuring a test device set up for testing an electronic control unit by a configuration system, whereby a software model of a technical system is executed in the test device and the software model communicates via an input/output interface of the test device with a device connected to the test device, whereby the configuration system has a first configuration element of a first element type and a second configuration element of a second element type, whereby the configuration elements are assigned properties of the test device with which the communication between the connected device and the software model is configured, wherein sorting of the properties occurs in the configuration system, and the sorting is switchable between the sorting types, namely, a union set sort, intersection sort, and condensing sort.

15 Claims, 3 Drawing Sheets

(56) References Cited

U.S. PATENT DOCUMENTS

| | | | | |
|---|---|---|---|---|
| 5,869,961 A * | 2/1999 | Spinner | ............... | G01R 1/0408 |
| | | | | 324/756.02 |
| 6,144,595 A * | 11/2000 | Hirooka | ................ | G11C 29/02 |
| | | | | 365/201 |
| 6,154,801 A * | 11/2000 | Lowe | ................... | G06F 11/221 |
| | | | | 710/119 |
| 6,684,385 B1 | 1/2004 | Bailey et al. | | |
| 6,847,900 B2 * | 1/2005 | Ragland | ............ | G01R 31/2812 |
| | | | | 378/58 |
| 7,933,734 B2 * | 4/2011 | Bruski | .................. | G05B 17/02 |
| | | | | 700/29 |
| 8,290,755 B2 * | 10/2012 | Bruski | ............... | G05B 23/0256 |
| | | | | 700/29 |
| 8,661,871 B2 * | 3/2014 | Tripoli | ................. | G01C 19/56 |
| | | | | 333/186 |
| 9,250,293 B2 * | 2/2016 | Xue | .................... | G01R 31/312 |
| 2003/0114996 A1 * | 6/2003 | Ragland | ............... | G01N 23/04 |
| | | | | 702/35 |
| 2005/0050515 A1 | 3/2005 | Shah et al. | | |
| 2005/0257194 A1 | 11/2005 | Morrow et al. | | |
| 2008/0183456 A1 * | 7/2008 | Bruski | .................. | G05B 17/02 |
| | | | | 703/13 |

OTHER PUBLICATIONS

German Office Action for German Application No. 102016102920.3 dated Dec. 15, 2016 with English translation.

* cited by examiner

METHOD FOR CONFIGURING A TEST DEVICE SET UP FOR TESTING AN ELECTRONIC CONTROL UNIT

This nonprovisional application claims priority under 35 U.S.C. § 119(a) to German Patent Application No. 10 2016 102 920.3, which was filed in Germany on Feb. 19, 2016, and which is herein incorporated by reference.

BACKGROUND OF THE INVENTION

Field of the Invention

The present invention relates to the development of control units as they are used, e.g., in the automotive industry or in the aviation industry for controlling technical systems such as, e.g., engines or brakes. The present invention relates in particular to test devices used in the control unit development process.

Description of the Background Art

The development of control units has become a highly complex process. Thus, new control units or new control functions are to be tested as early as possible in the development process in order to check the general functionality and to set the direction of further development. It is important toward the end of the development process to test the already far developed control unit as comprehensively as possible in order to make the necessary modifications based on the test results before the control unit is placed in use or goes into mass production and functions as desired under all circumstances in later operation.

The methods of hardware-in-the-loop simulation (HIL simulation) and rapid control prototyping (RCP) are known for testing control units. In the HIL simulation, an electronic control unit is connected to a test device (HIL simulator) in which, for example, a software model of the system to be controlled or regulated by the control unit is executed. The software model is also called an environmental model. The test device therefore simulates the physical environment of the later use for the control unit. In RCP, in contrast, a software model of a control unit to be developed or improved is executed in the test device. In the case of RCP, a technical system connected externally to the test device is then controlled or regulated by means of the model executed in the test device via the test device.

The testing of a (mass-produced) control unit employed in the end product is the endpoint of multiple preceding development steps of closed-loop or open-loop control to be implemented in the control unit, whereby these development steps are usually described with the so-called V-model or V-cycle as well. Controller development, essential for the function of many technical systems, starts off with the mathematical modeling of the control algorithm on a computer with a mathematical and graphical modeling environment, whereby the controller should be considered part of the control unit. In addition, the environment of the control unit is also modeled mathematically, because the interaction of the controller on the control unit with the process to be controlled is of interest. In these functional mathematical considerations, a simulation in real time is generally not necessary (offline simulation).

In the next step, the previously developed control algorithm is transferred by rapid control prototyping to a powerful hardware unit that is usually real-time-capable and is connected to the actual physical process by suitable I/O interfaces, therefore, for example, to a motor vehicle engine. This real-time-capable hardware has nothing to do with the mass-produced control unit to be used later. At issue here is proof of the basic functionality in practice of the previously developed control.

In another step, as part of automatic production code generation, the control is implemented in the target processor likely to actually be used later in the mass-produced control unit. Accordingly, in this step, the target hardware approximates the mass-produced control unit, but is not identical to the mass-produced control unit.

In another step, the mass-produced control unit, which normally does not exist until a later development stage, is tested as part of a hardware-in-the-loop test (HIL). The (mass-produced) control unit, physically present in this step, is connected here by its physical control unit interface to a powerful simulation computer, often simply called a simulator. The simulator simulates the required variables of the real control unit to be tested and exchanges input and output variables with the control unit. The pins of the physical control unit interface of the control unit are connected to the simulator by a cable harness. In this way, it is possible to simulate in the simulation environment all required variables, for example, of a motor vehicle engine, if applicable the entire motor vehicle with engine, drivetrain, chassis, and road test, and to test the behavior of the control unit in interaction with the simulation environment in a risk-free manner.

Configuration systems with configuration diagrams are often used for configuring test devices, such as, for example, HIL or RCP systems. These configuration systems can be, e.g., graphical programming environments such as the software environments LabView® from National Instruments® or Simulink® from The Mathworks®.

The known configuration systems or configuration diagrams have the disadvantage that the configuration of the test device hardware properties is time-consuming and laborious.

SUMMARY OF THE INVENTION

It is therefore an object of the invention to develop the configuration process of HIL and RCP simulations further and in particular to simplify it, to make it more flexible, and to accelerate it.

In an exemplary embodiment, a method is provided for configuring a test device set up for testing an electronic control unit via a configuration system, whereby a software model of a technical system is executed in the test device and the software model communicates via an input/output interface of the test device with a device connected to the test device. The configuration system can have a first configuration element of a first element type and a second configuration element of a second element type, whereby the configuration elements can be assigned properties of the test device with which the communication between the connected device and the software model is configured. Sorting of the properties can occur in the configuration system, and the sorting is switchable between the sorting types, namely, a union set sort, intersection sort, and condensing sort, whereby the union set sort sorts the properties such that the properties assigned to the first configuration element form a joined set that contains only the properties assigned to the first configuration element, and the properties assigned to the second element form a joined set that contains only the properties assigned to the second configuration element, whereby the intersection sort sorts the properties such that a joined set of those properties is formed whose assigned configuration elements are of the same element type, whereby the condensing sort occurs such that a joined set is formed of the properties that are included both in the first and second configuration element.

This method has the advantage that the properties of the test device can be sorted differently in different configuration scenarios. It can be advantageous depending on the configuration scenario to sort the properties in the union set sort, intersection sort, or condensing sort. A more rapid and more flexible access to the properties is possible due to the sorts, as a result of which the configuration of the test device occurs more rapidly and simply. The element types of the first and second configuration element can be of the same type or of a different type. A further advantage of the method of the invention is that it can lead to a lower memory requirement and more rapid storing.

In an embodiment of the method, it is considered in addition in the intersection representation that the joined set can be formed by the properties that are included both in the first and second configuration element. Conversely, this can also mean that properties are excluded by the intersection sort from a joined set, if they are not included both in the first and second configuration element.

This embodiment is especially advantageous, if properties are to be grouped that are supported both by the first and second configuration element.

According to an embodiment, the first and/or second configuration element can be hierarchically structured.

The method of the invention becomes especially advantageous due to a hierarchical structuring of the configuration elements, because the hierarchical structuring in the sortings by different types can be considered with different advantages in each case.

An embodiment provides that the elements of the joined set in a hierarchical arrangement can have a common higher-level element.

This results in the advantage of an especially simple sorting or storing according to the sorting, if the elements of the joined set in a hierarchical arrangement have a common higher-level element such as, e.g., a configuration element or a property.

In an embodiment of the method, the properties of the configuration elements can be assigned parameters (parameter values) and the communication between the connected device and the software model can be configured by the parameters, and the parameters of identical properties can be modified together in the intersection sort and/or condensing sort.

This results in an especially rapid configuration option for the test device, because any number of common properties of different hardware units of the test device can be set with a single step.

In an embodiment of the method, the configuration elements are data structures or program functions for storing input/output functionalities of the input/output interfaces of the test device.

An embodiment of the method provides that the test device can be a hardware-in-the-loop simulator or a rapid control prototyping unit.

An embodiment of the method provides that the configuration system comprises a filter mechanism for filtering the sorted properties.

This filter mechanism can be used advantageously to filter out certain configuration properties from many configuration properties, e.g., by specifying specific filters or by searching for text strings in the properties (string filter). This is advantageous particularly in a large number of different properties. The filter mechanism can be used further also to filter significant properties (significance filter). Significant properties in this case are properties that are supported by the current configuration of the test device. This is advantageous, because the test device can be built up modularly from different I/O units, and certain properties can be supported only by certain I/O units. The significance filter accordingly can also comprise an analysis of the test device structure in order to determine the scope of the properties supported by the test device. Only those properties are therefore shown with the significance filter that are supported by the current test device hardware configuration.

In an embodiment, it is provided that the configuration system can comprise an expansion mechanism.

Hierarchically sorted properties at different levels can be automatically loaded into or unloaded from a memory by an expansion mechanism, which in a graphical configuration environment is expressed by an opening and closing of different levels in a hierarchical tree structure. This results in rapid access to the properties of the test device.

The test device can be configured by the compilation of program code generated with the configuration environment with consideration of the configuration element properties. The compilation can occur more rapidly and more efficiently by sorting using the method of the invention.

In an embodiment of the method, it is provided that the configuration elements can have ports, and connections between the ports of two different configuration elements can be automatically assigned to enable electronic communication. An automatic assignment of configuration elements such as, e.g., ports can occur more rapidly, more efficiently, and more robustly by the sorting of the invention.

In an embodiment of the method, it is provided that the properties are transferred to the test device with consideration of the sorting and are stored in the test device. The transfer can occur more rapidly and more efficiently, if the data are bundled or combined during the transmission according to the sorting.

The invention relates further to a test device and an external computing device connected thereto such as, e.g., a computer, a tablet, or a mobile radio device, whereby the test device is set up for testing a control unit, whereby a software model of a technical system is executed in the test device and the software model communicates via an input/output interface of the test device with a device connected to the test device, and whereby the external computing device is set up to execute the method.

The invention also relates to a computer program product and computer program for executing a method for configuring a test device set up for testing an electronic control unit, the test device being designed such that the method can be executed.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
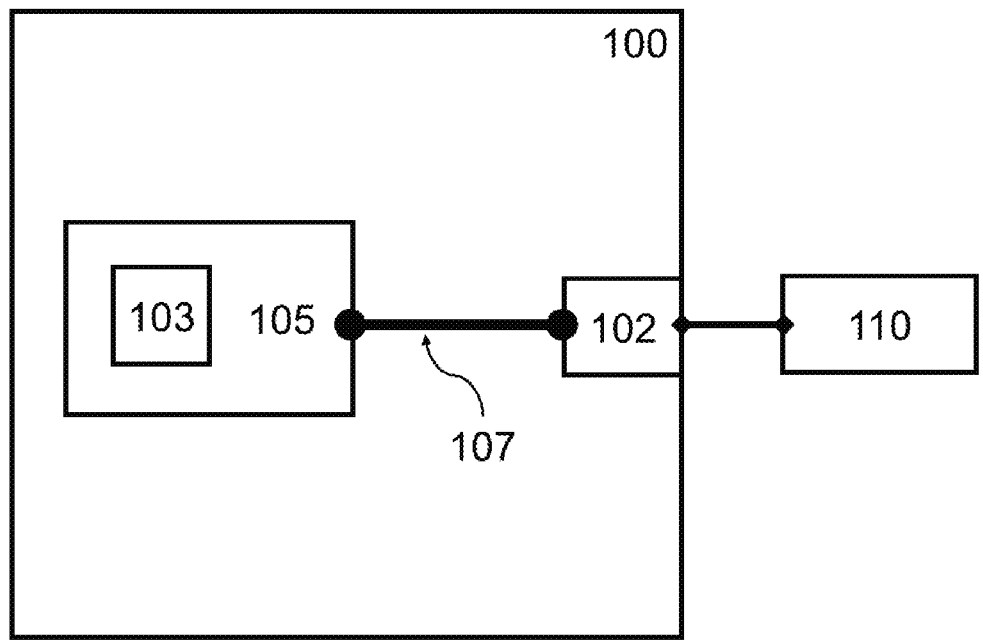
FIG. 1 shows a schematic diagram of a test device.

Shown in FIG. 1 is a test device 100 in which a software model 103 of a technical system is executed in a computing unit 105, whereby the software model or the computing unit communicates via an input/output interface 102 of the test device and an internal data connection 107 with a device 110 connected to the test device. A computing unit can be, e.g., a processor, an FPGA, or an embedded PC. The communication with the test device can occur via the transmission of analog or digital electrical signals. The test device can comprise different hardware units (e.g., plug-in cards), which form input/output interface 102. The input/output interface and computing unit 105 form a connected system, but can also be separated spatially from one another and connected together via electronic connections.

Test device 100 can be, e.g., a "hardware-in-the-loop" (HIL) simulator. Test device 100 can also be a "rapid control prototyping" (RCP) system. The test device can also be a device, however, that is suitable for executing HIL tests or RCP tests in that a model of a technical system can be executed in the test device and this model can exchange data via input/output interfaces with a device to be tested, e.g., a control unit, connected to the test device, whereby particularly the response of the test device to the data, which result from the model and are transmitted to the control unit, e.g., in the form of electrical signals, is analyzed with this data exchange.

A software model 103, therefore, e.g., a model of a technical system, can be present, for example, in the form of a software model, which is specified by a source code, e.g., in a high-level language such as C, C++, or in a machine language such as, e.g., assembler or executable machine code. Any system can be modeled by a technical model in order to simulate it virtually. Thus, for example, a model of an engine can exist as software, whereby the software is programmed such that during a simulation, here therefore an execution of the model on a CPU or FPGA, input parameters are processed by the software and output values are produced depending on the input parameters and the instance of the model. An input parameter can be, for example, a voltage applied to a throttle valve of a gasoline engine and output values in this case could be a resulting throttle valve opening angle, fuel consumption, and/or torque resulting on the crankshaft. Nevertheless, the model can also be a model of a control unit to be tested or to be developed.

Figure 2:
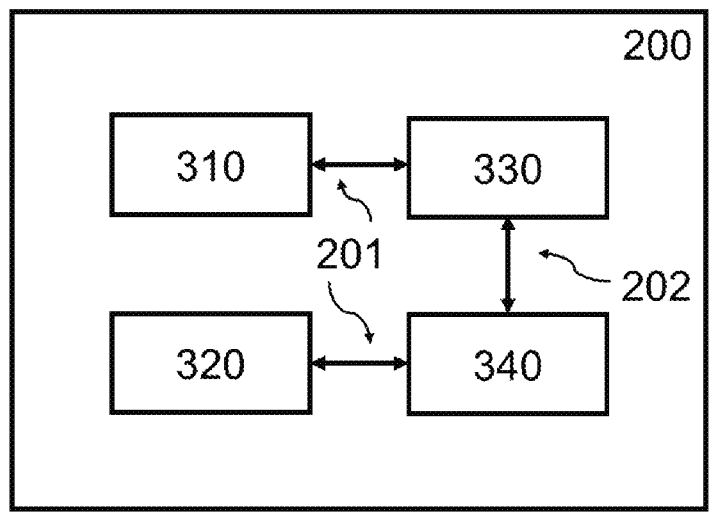
FIG. 2 shows a schematic diagram of a configuration system.

FIG. 2 schematically shows a configuration system 200 or configuration diagram, which contains a plurality of configuration elements (310, 320, 330, 340), which can be connected with connecting lines (201, 202) for configuring the test device 100.

For example, properties and functionalities of the test device, particularly the input/output interfaces and/or the model interfaces or internal data connections 107, can be configured with the configuration elements. Exemplary properties are, inter alia, interface types, voltage/current ranges, units, unit scaling, data types, duty cycles, frequencies, and/or error injections. These properties can be specified by parameters, e.g., by predetermined selection options of a plurality of parameters or by a free parameter input option. These properties can be transferred by means of the configuration system to the test device, where they can be stored and can thus result in a configuration of the test device in accordance with the properties. This configuration process can also occur indirectly, e.g., by means of code generation in accordance with the properties, and/or a subsequent compilation of the generated code, transfer of the code or the compiled code to the test device, and execution of the compiled code in the test device. The storage of the properties in the test device can therefore also occur by means of source code or binary code.

Figure 3:
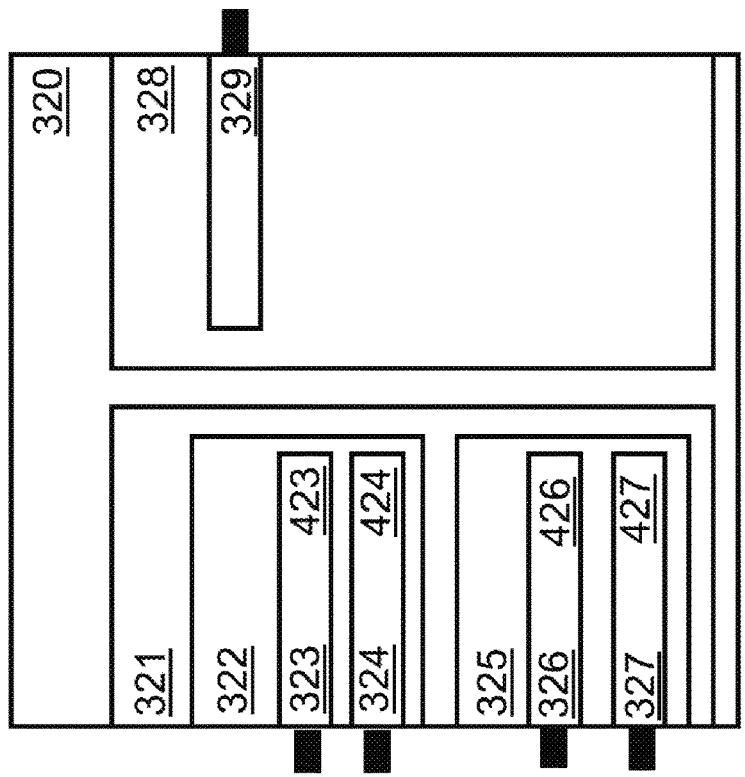
FIG. 3 shows a schematic diagram of configuration elements.
Figure 5:
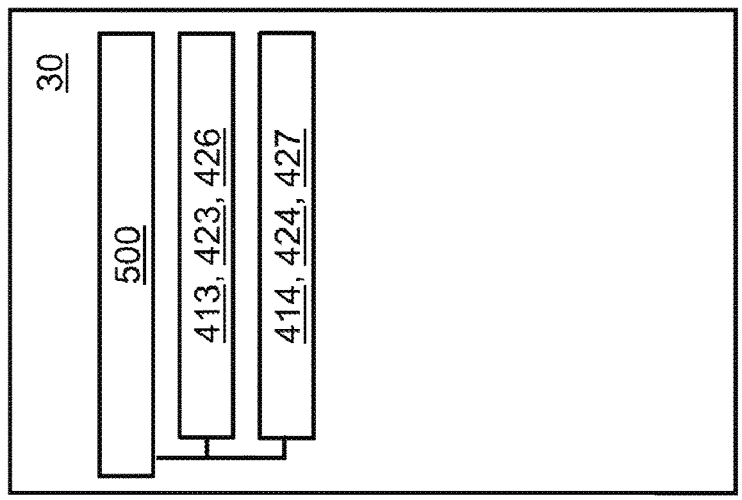
FIG. 5 shows a table with exemplary assignments of properties and roles to configuration elements.
Figure 5:
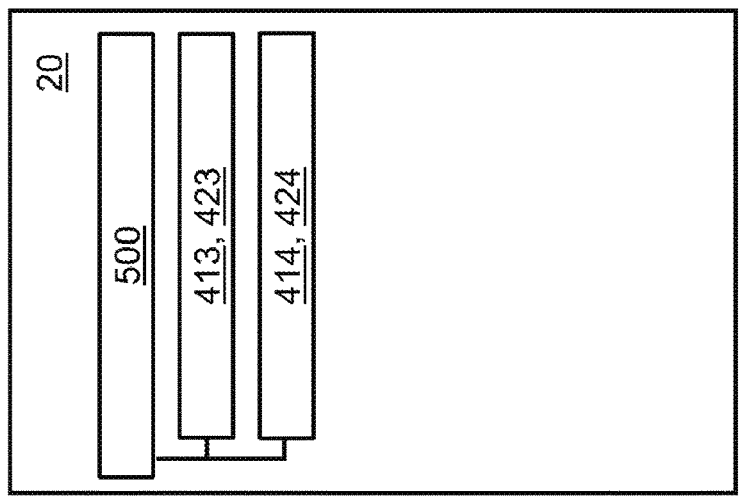
Figure 5:
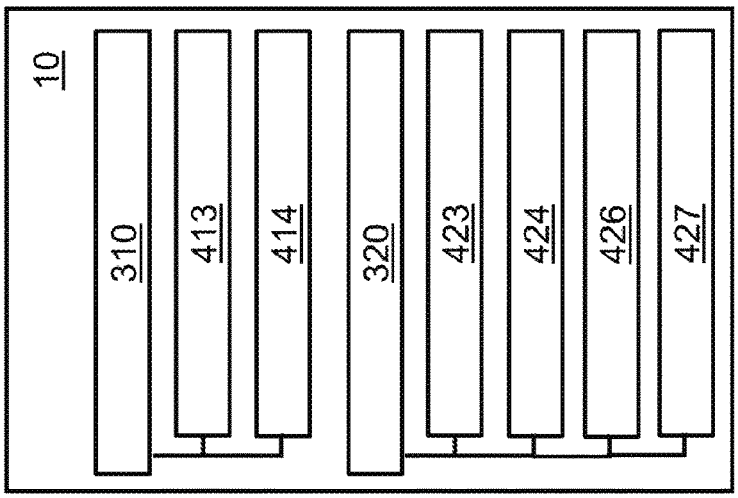

The configuration elements can be assigned properties of the test device with the associated parameters of the properties and the communication can be configured by means of the parameters, therefore particularly the functionality between the connected device and the software model. In a graphical configuration environment, the individual configuration elements can also be connected to one another in order to configure the test device in this way. Different configuration elements can be connected together, in other words associated or assigned, with the connecting lines (201, 202). It can be configured by these assignments that different hardware components of the test device such as, e.g., processors, FPGAs, input/output boards, storage media, and the like exchange data with one another, therefore receive and send electrical signals. FIG. 3 shows particular forms of configuration elements 310 and 320 in which the configuration elements have a hierarchical structure. The different hierarchical levels (311, 312, 313, 314, 315, 316) of the configuration element can in turn be regarded as configuration elements (311, 312, 313, 314, 315, 316). The configuration elements in each case are a specific element type. An element type or role of an element in regard to this invention is understood to be a technical type identification of an element. Exemplary element types are input/output units, input/output channels, input/output cards, routers, potentials, slot pins, function ports, function blocks, signal conditioners, and/or logic signals. In the specific example in FIG. 3, configuration element 310 can be at the highest hierarchical level, for example, of the type "input/output function" or "IO function," "function block" or special "voltage in/out," "current in/out," "analog/digital in/out," or "PWM in/out." Configuration elements 311 and 315 of the next lower hierarchical level can be, for example, of the type "electrical interface" or "model interface." Configuration elements 312 of the next lower hierarchical level can be, for example, of the type "logical signal." The configuration elements of the lowest hierarchical level can be, e.g., of the type "function port," "signal port," or "model port" and also be designated in general as a port. A tabular overview of exemplary element types or roles and properties, which can be assigned to the particular configuration elements, is provided in FIG. 5. In a hierarchical structure of the configuration elements, it can also be the case that a property is associated in addition also with the configuration elements that are hierarchically superordinate and/or subordinate to the configuration element associated primarily with the particular property.

The configuration elements can be assigned properties of the test device at all hierarchical levels. Because the number of properties can be very large, a representation of the properties that enables a person to set the huge number of adjustable properties represents a great technical hurdle. This problem can be resolved, however, according to the invention by the different sorting types shown in FIG. 4.

In the exemplary embodiment depicted here, configuration elements 313 and 314 are assigned properties 413 and 414. Because configuration elements 313 and 314 are hierarchically subordinate to configuration element 310, properties 413 and 414 can also be assigned to configuration element 310 and/or to the configuration elements between configuration elements 310 and 314.

Accordingly, in this exemplary embodiment, the properties 423, 424, 426, and 427 are assigned to configuration elements 323, 324, 326, and 327, which are hierarchically subordinate to configuration element 320. Because configuration elements 323, 324, 326, and 327 are hierarchically subordinate to configuration element 320, the properties 423, 424, 426, and 427 can also be assigned to configuration element 320 and/or be assigned to the configuration elements between configuration elements 320 and 323, 324, 326, or 327.

The properties can be stored physically in the test device, e.g., as data structures, file structure, function structure, program structure, variables, parameters, or the like.

The configuration elements at the lowest hierarchical level (e.g., 313 and 314) can also be called ports. These can be connected to ports of other configuration elements in order to enable in this way data exchange or communication or signal exchange between the connected configuration elements or the hardware units associated therewith. This connection can also occur automatically with consideration of the properties and/or roles.

A configuration element can also be, e.g., a graphical element (block, UML node, etc.) in a graphical user interface such as, e.g., a configuration diagram. A configuration element can also be a smaller part of a larger graphical element in a graphical user interface.

Figure 4:
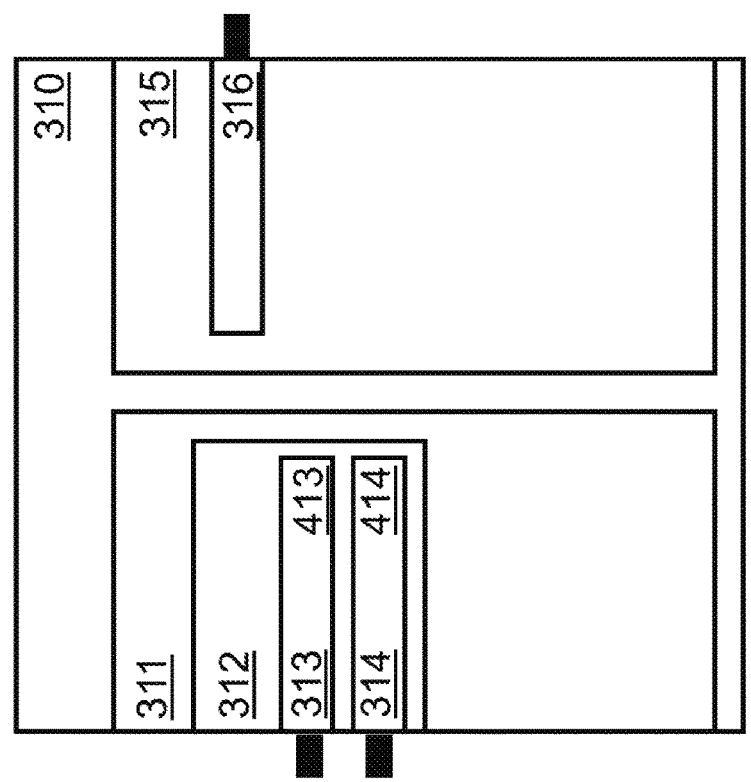
FIG. 4 shows a schematic diagram of sorting types.

FIG. 4 shows the different sort types, namely, union set sort 10, intersection sort 20, and condensing sort 30 or the properties groups resulting from the various sorts. The exemplary sorts from FIG. 4 reproduce the particular application that the configuration elements from FIG. 3 are associated with the properties and element types shown underlined in FIG. 5.

An exemplary union set sort 10 is shown in FIG. 4, which sorts the properties such that the properties assigned to the first configuration element form a joined set that contains only the properties assigned to the first configuration element 310, and the properties assigned to the second configuration element 320 form a joined set that contains only the properties assigned to the second configuration element. Here, the properties are sorted in such a way, as can result after a union set sort after a joint selection (multiselection for sorting) of configuration elements 310 and 320, whereby the hierarchically subordinate configuration elements 313, 314, 323, 324, 326, and 327 are selected jointly indirectly as well. Properties 413 and 414 here form a joined set, because they are assigned to the same configuration element 310. Accordingly, properties 423, 424, 426, and 427 form a further joined set, because they are all assigned to configuration element 320. The properties in this case can also be arranged according to the hierarchical level of the associated higher-level configuration element, which is shown by way of example in FIG. 4 by the hierarchically higher-level depiction of configuration elements 310 and 320. The configuration elements are therefore not necessarily part of the sorted set, but are also shown in FIG. 4 according to a grouping by configuration elements.

The joined set in this specific exemplary embodiment is characterized in that the individual properties 413 and 414 or 423 to 427 are connected together. A joined set within the meaning of the invention can also be distinguished in that the elements of the set, therefore the properties, contain no element from another set. Provided the configuration elements and thereby also their properties are hierarchically structured, the joined set can also be characterized in that the elements of the set in a hierarchical arrangement have a common higher-level element. The elements of a joined set can be stored together on a volatile or nonvolatile physical storage medium, for example, a hard drive, a flash drive, or RAM/ROM memory, whereby the storing can occur according to the sorting type as a joined set. Thus, access of the test device to the stored properties can occur more rapidly and more efficiently in order to optimize the configuration of the test device and, moreover, the physical communication with the externally connected device.

It is shown further in FIG. 4 how a sorting of the properties can result after an intersection sort 20. Here, properties 413 and 423 form a joined set, because their assigned configuration elements 313 and 323 and all higher-level configuration elements on the same level are of the same element type according to the association shown in FIG. 5. This applies as well to properties 414 and 424. In an alternative variant of the invention, after intersection sort 20 these can also form a joined set with properties 413 and 423, which is not necessarily the case, however. Properties 413 and 423 can also be grouped in addition, because they are the same properties of different hardware elements of the test device, e.g., the property "port type." By means of this grouping, the parameters of these properties (e.g., "in" or "out") for all properties and hardware units, associated with the properties, can be set and stored together according to the grouping or sort. It is therefore not possible by the grouping according to intersection sort 20 to configure parameters simultaneously which occur only in a part of selected hierarchies, therefore selected configuration elements.

It is also shown in FIG. 4 how a sorting of the properties after a condensing sort 30 can result. Here, for example, properties 413, 423, and 426 form a joined set, because according to the association shown in FIG. 5 they are assigned to both first configuration element 310 and second configuration element 320. Here, therefore, those properties form a joined set that are relevant both for the hardware associated with first configuration element 310 (e.g., the input/output interface) and the hardware associated with second configuration elements 320. Because here the type of the configuration elements is not taken into account during the sorting as in intersection sort 20, more properties are combined here than in the intersection sort. More parameters can also be edited simultaneously thereby, which is especially advantageous.

In the sorting types, particularly in the intersection sort or condensing sort, it can be taken into account further that a joined set or a grouping of those properties is formed that can be configured similarly. A jointly editable value must therefore be applicable to all elements of the joined set. The similarity of the configurability can be characterized in that the properties or the associated parameters possess, e.g., the same unit, the same value range, and/or the same writability.

It can be advantageous both in intersection sort 20 and in condensing set sort 30 to group the properties after the sorting according to the roles of the configuration elements associated with them.

In the case of the sorting after intersection sort 20 or condensing set sort 30, a grouping of the properties with a higher-level element 500 can also occur, which can be, e.g., a specific joint element type.

The groupings or sortings of the properties can also comprise further hierarchical levels. Here, in a particular embodiment of the invention, an expansion mechanism can also be provided. It is possible with this mechanism to insert or remove automatically certain hierarchical levels of the grouping. In particular, for example, it is possible to switch between a consideration of all hierarchical levels and a consideration of only the highest hierarchical level.

In a graphical configuration environment, the method can also take shape in such a way that the selection of different sorting types has no effect on the representation of the parameters. If a plurality of configuration elements comprise, for example, no common properties, the same representation or grouping of the properties, e.g., in a tree diagram can occur in the union set sort and the intersection sort.

Following a sorting of the properties, a grouping of the properties according to the sorting can also occur, so that the properties of a joined set are grouped. The properties are therefore combined by the intersection sort and/or condensing sort, if they form a joined set. This can also be expressed such that the properties are grouped by the sorting.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for configuring a test device set up for testing an electronic control unit via a configuration system, the method comprising:
    executing a software model of a technical system in the test device, the software model communicating via an input/output interface of the test device with a device connected to the test device, the configuration system having a first configuration element of a first type and a second configuration element of a second type,
    assigning properties of the test device to the first configuration element and the second configuration element, a communication between the connected device and the software model being configured with the properties;
    sorting the properties in the configuration system, the sorting being switchable between sorting types, the sorting types including a union set sort, an intersection sort, and a condensing sort; and
    sorting the properties of the union set sort resulting in the properties assigned to the first configuration element generating a first joined set that contains only the properties assigned to the first configuration element, and the properties assigned to the second element generating a second joined set that contains only the properties assigned to the second configuration element,
    wherein the intersection sort sorts the properties resulting in a third joined set of the properties whose assigned configuration elements are of a same type,
    wherein the condensing sort occurs resulting in a fourth joined set of the properties that are included in both the first configuration element and second configuration element,
    wherein the test device is configured by compiling program code generated with the configuration environment based on the properties of the first configuration element and the second configuration element, and
    wherein the first configuration element and the second configuration element have ports, and connections between the ports of the first configuration element and the second configuration element are automatically assigned to enable electronic communication.

2. The method according to claim 1, wherein, in the intersection sort, the third joined set is formed of properties that are included in both the first and second configuration element.

3. The method according to claim 1, wherein the first configuration element or the second configuration element are hierarchically structured.

4. The method according to claim 1, wherein the first configuration element and the second configuration element of the fourth joined set, in a hierarchical arrangement, have a common higher-level element.

5. The method according to claim 1, wherein parameters are assigned to the properties of the first configuration element and the second configuration element,
    wherein the communication between the connected device and the software model is configured via the parameters, and
    wherein the parameters of identical properties of the properties are modified together in the intersection sort or condensing sort.

6. The method according to claim 1, wherein the first configuration element and the second configuration element are data structures or program functions for storing input/output functionalities of the input/output interfaces of the test device.

7. The method according to claim 1, wherein the test device is a hardware-in-the-loop simulator or a rapid control prototyping unit.

8. The method according to claim 1, wherein the configuration system comprises a filter mechanism for filtering the properties.

9. The method according to claim 1, wherein the configuration system comprises an expansion mechanism.

10. The method according to claim 1, wherein the properties are transferred to the test device based on the sorting via the configuration system and stored in the test device.

11. A combination of the test device and an external computing device connected thereto, wherein the test device is configured to test a control unit,
    wherein the software model of the technical system is executed in the test device and the software model communicates via the input/output interface of the test device with the control unit connected to the test device, and
    wherein the external computing device executing the method according to claim 1.

12. The combination according to claim 11, wherein the external computing device comprises a computer, tablet, or mobile radio device.

13. A computer program product and a computer program for executing a method for configuring the test device configured to test an electronic control unit, the test device executing the method according to claim 1.

14. The method according to claim 1, wherein the first type includes a plurality of first variations,
    wherein the second type includes a plurality of second variations, and
    wherein the first variations of the first type and the second variations of the second type are formed of a same or different variations.

15. The method according to claim 14, wherein the variations comprise differences in input/output units, input/output channels, input/output cards, routers, potentials, slot pins, function ports, function blocks, signal conditioners, and/or logic signals.

* * * * *